United States Patent
Maejima (10) Patent No.: US 6,465,924 B1
(45) Date of Patent: Oct. 15, 2002

(54) MAGNETIC BEARING DEVICE AND A VACUUM PUMP EQUIPPED WITH THE SAME

(75) Inventor: Yasushi Maejima, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/537,940

(22) Filed: Mar. 29, 2000

(30) Foreign Application Priority Data

Mar. 31, 1999 (JP) .......................................... 11-092049

(51) Int. Cl.$^7$ ................................................ H02K 7/09
(52) U.S. Cl. ..................................... 310/90.5; 310/112
(58) Field of Search ......................... 310/90.5, 90, 91, 310/216–218, 254, 258, 259, 112; 417/410.1, 423.1; 324/166, 173; 29/596–598

(56) References Cited

U.S. PATENT DOCUMENTS

| 3,747,998 A | | 7/1973 | Klein et al. ................... 308/10 |
| 4,607,197 A | * | 8/1986 | Conrad ........................ 318/116 |
| 4,683,391 A | * | 7/1987 | Higuchi ..................... 310/90.5 |
| 4,908,534 A | * | 3/1990 | Gubler et al. ................. 310/45 |
| 4,929,158 A | | 5/1990 | Girault ....................... 417/405 |
| 5,270,601 A | | 12/1993 | Rigney, II .................. 310/90.5 |
| 5,289,067 A | | 2/1994 | Tanaka et al. .............. 310/90.5 |
| 5,514,924 A | * | 5/1996 | McMullen et al. ......... 310/90.5 |
| 5,875,540 A | * | 3/1999 | Sargeant et al. .............. 29/596 |
| 6,121,704 A | * | 9/2000 | Fukuyama et al. ......... 310/90.5 |

* cited by examiner

Primary Examiner—Tran Nguyen
(74) Attorney, Agent, or Firm—Adams & Wilks

(57) ABSTRACT

To facilitate the fabrication work of a stator column assembly and improve full and wise use of resources, as well as to prevent contact accident between a mold portion of a stator column and a rotor shaft due to the thermal inflation. A first electromagnet unit (30), a stator coil unit (20), and a second electromagnet unit (40) are engaged to and arranged in a cylindrical stator column (11) in the order stated, the first electromagnet unit (30) comprising an electromagnet (31) of a first active radial magnetic bearing and a radial displacement sensor (32) for the electromagnet (31) which are attached in a first circular holding member (30c) to be coated and molded with a resin mold (30d), the stator coil unit (20) comprising a stator coil (21a) that is attached in a circular yoke member (20c) to be coated and molded with a resin mold (20d), the second electromagnet unit (40) comprising an electromagnet (41) of a second active radial magnetic bearing and a radial displacement sensor (42) for the electromagnet (41) which are attached in a second circular holding member (40c) to be coated and molded with a resin mold (40d).

11 Claims, 6 Drawing Sheets

FIG.6
PRIOR APT

MAGNETIC BEARING DEVICE AND A VACUUM PUMP EQUIPPED WITH THE SAME

BACKGROUND OF THE INVENTION

1. Field of the Invention

The present invention relates to a magnetic bearing device comprising magnetic bearings, including an active magnetic bearing for rotatably supporting a rotor shaft that is driven and rotated by a motor having a stator coil, and to a vacuum pump equipped with the magnetic bearing device. More specifically, the present invention relates to the structure of a stator column assembly in which an electromagnet of the active magnetic bearing, a displacement sensor for the electromagnet and the stator coil are arranged in a cylindrical stator column.

2. Description of the Related Art

Figure 6:
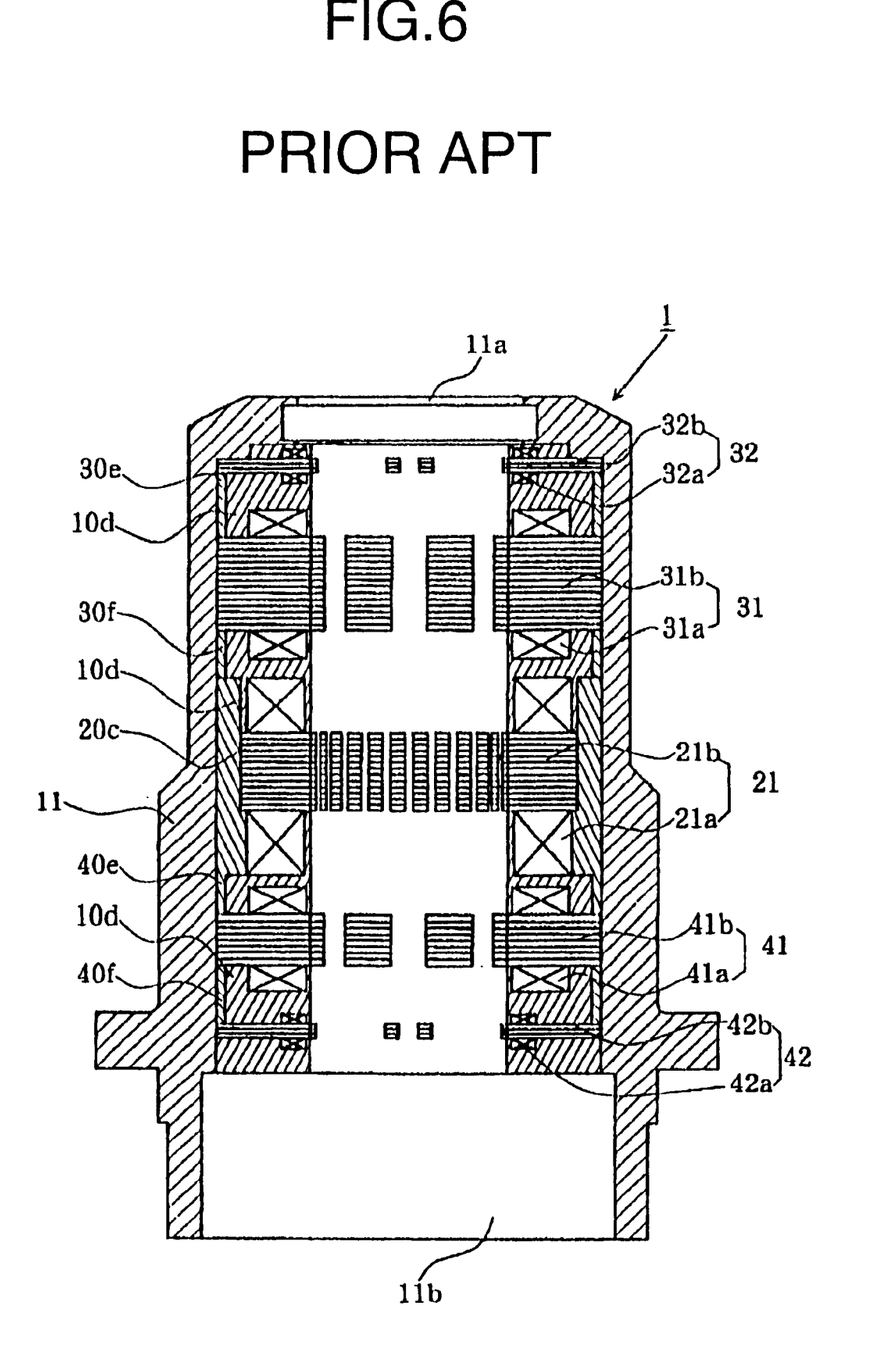
FIG. 6 is a vertical sectional view showing an example of a stator column assembly of a conventional magnetic bearing device.

FIG. 6 is a vertical sectional view showing a conventional stator column assembly 1 having a cylindrical stator column. This stator column assembly 1 is of the kind used in a magnetic bearing device in which magnetic bearings consisting of a first active radial magnetic bearing, a second active radial magnetic bearing and a thrust magnetic bearing (not shown) are used to rotatably support a rotor shaft that is driven and rotated by a motor having a stator coil, namely, a 5-axis control type magnetic bearing device.

In FIG. 6, the stator column assembly 1 comprises a cylindrical stator column 11 in which a first active radial magnetic bearing, a stator coil 21 of a motor and a second active radial magnetic bearing are housed and fixed at given positions. The cylindrical stator column 11 is a metal (e.g., aluminum) cylindrical member having a cylindrical space therein and having on its top a through hole 11a for a rotor shaft to pierce through and on its bottom an opening 11b. The stator coil 21 comprises a plurality of magnetic cores 21b, for example, 24 cores, each having a coil 21a wound therearound and press-fitted into a metal circular yoke 20c. The first active radial magnetic bearing comprises an electromagnet 31 and a radial displacement sensor 32 for the electromagnet 31. The electromagnet 31 consists of four pairs of magnetic cores 31b and coils 31a wound around the magnetic cores 31b. The radial displacement sensor 32 consists of four pairs of magnetic cores 32b and coils 32a wound around the magnetic cores 32b. The second active radial magnetic bearing comprises an electromagnet 41 and a radial displacement sensor 42 for the electromagnet 41. The electromagnet 41 consists of four pairs of magnetic cores 41b and coils 41a wound around the magnetic cores 41b. The radial displacement sensor 42 consists of four pairs of magnetic cores 42b and coils 42a wound around the magnetic cores 42b.

The stator column assembly 1 shown in FIG. 6 is fabricated as follows. First, into a cylindrical space within the cylindrical stator column 11 that has been heated at an appropriate temperature, the radial displacement sensor 32 of the first active radial magnetic bearing, a circular spacer member 30e, the electromagnet 31 of the first active radial magnetic bearing, a circular spacer member 30f, the stator coil 21, a circular spacer member 40e, the electromagnet 41 of the second active radial magnetic bearing, a circular spacer member 40f, and the radial displacement sensor 42 of the second active radial magnetic bearing are press-fitted in the order stated, fixing these parts at given positions. After completion of the press fitting, a columnar bushing is inserted therein from the opening 11b and the space is filled with a thermally curable epoxy resin material, coating those parts with the material and simultaneously forming an inner cylinder surface of resin mold inside the cylindrical stator column 11. When the molding work is finished, the inner cylinder surface of mold is subjected to cutting and scraping, to thereby expose the stator magnetic cores 21b, the electromagnet magnetic cores 31b, 41b, and the sensor magnetic cores 32b, 42b. The fabrication of the stator column assembly 1 is completed through, at least, three steps described above. Incidentally, reference symbol 10d denotes a mold portion.

The conventional stator column assembly 1 shown in FIG. 6 has some problems. The first of those problems is awkward fabrication work in constructing the stator column assembly, for the components are arranged in the cylindrical stator column 11 by using the circular spacers and by press-fitting the components through the use of a shrinkage fit. Secondly, this awkward fabrication work leads to defective articles. That is, every component has an electric wire for wiring and hence the breakage of the wire may take place during the fabrication. Thirdly, when an article turns out to be defective due to the breakage of wire or other factors, it is not an option to replace only the parts where the breakage of wire takes place because the whole assembly is coated with resin mold after the shrinkage fit. This makes the whole stator column assembly 1 which has been fixed a defective product, resulting in the disposal of the entire product. Furthermore, the fourth of those problems is that the mold portion 10d is integrated with the cylindrical stator column 11, which brings about the risk of making the mold portion 10d come in contact with the rotor shaft when the magnetic bearing device is heated from extended hour operation. of the motor to expand the mold portion 10d inwardly to the stator column assembly 1. If this possibility becomes a reality, a vacuum pump equipped with this magnetic bearing device is inhibited from operating normally.

SUMMARY OF THE INVENTION

A first object of the present invention is to remove the difficulty in fabricating a stator column assembly in a magnetic bearing device comprising magnetic bearings that include an active magnetic bearing for rotatably supporting a rotor shaft that is driven and rotated by a motor having a stator coil, the magnetic bearing device having the stator column assembly in which components such as the stator coil and electromagnets are housed and coated with a mold. A second object of the invention which is to be attained is to provide a stator column assembly whose structure permits to use resources fully and wisely. A third object of the invention which is to be attained is to save a magnetic bearing device having a stator column assembly from inhibition of normal operation due to the thermal expansion of a mold portion of the stator column. A fourth object of the invention which is to be attained is to provide a vacuum pump less costly and higher in performance than in prior art.

In order to attain the first and second objects mentioned above, there is provided a magnetic bearing device comprising magnetic bearings, the bearings including an active magnetic bearing for rotatably supporting a rotor shaft that is driven and rotated by a motor having a stator coil, in which an electromagnet unit and a stator coil unit are engaged to a cylindrical stator column in the order stated, the electromagnet unit comprising an electromagnet of the active magnetic bearing and a displacement sensor for the electromagnet which are attached to a circular holding member and then coated and molded with the use of a resin mold, the stator coil unit comprising the stator coil that is attached to the circular holding member and then coated and molded with the use of a resin mold.

Also, there is provided a magnetic bearing device comprising an active thrust magnetic bearing and first and second active radial magnetic bearings the three of which are used to rotatably support a rotor shaft that is driven and rotated by a motor having a stator coil, in which a first electromagnet unit, a stator coil unit and a second electromagnet unit are engaged to a cylindrical stator column in the order stated, the first electromagnet unit comprising an electromagnet of the first active radial magnetic bearing and a radial displacement sensor for the electromagnet which are attached to a first circular holding member and then-coated and molded with the use of a resin mold, the stator coil unit comprising the stator coil that is attached to a circular yoke member and then coated and molded with the use of a resin mold, the second electromagnet unit comprising an electromagnet of the second active radial magnetic bearing and a radial displacement sensor for the electromagnet which are attached to a second circular holding member and then coated and molded with the use of a resin mold.

In order to attain the third object mentioned above, the thickness in the axial direction of the mold is slightly thinner than the thickness in the axial direction of the circular holding member.

In order to attain the fourth object mentioned above, one of the aforementioned magnetic bearing device is adopted for a magnetic bearing of a vacuum pump.

DETAILED DESCRIPTION OF THE PREFERRED EMBODIMENT

Figure 1:
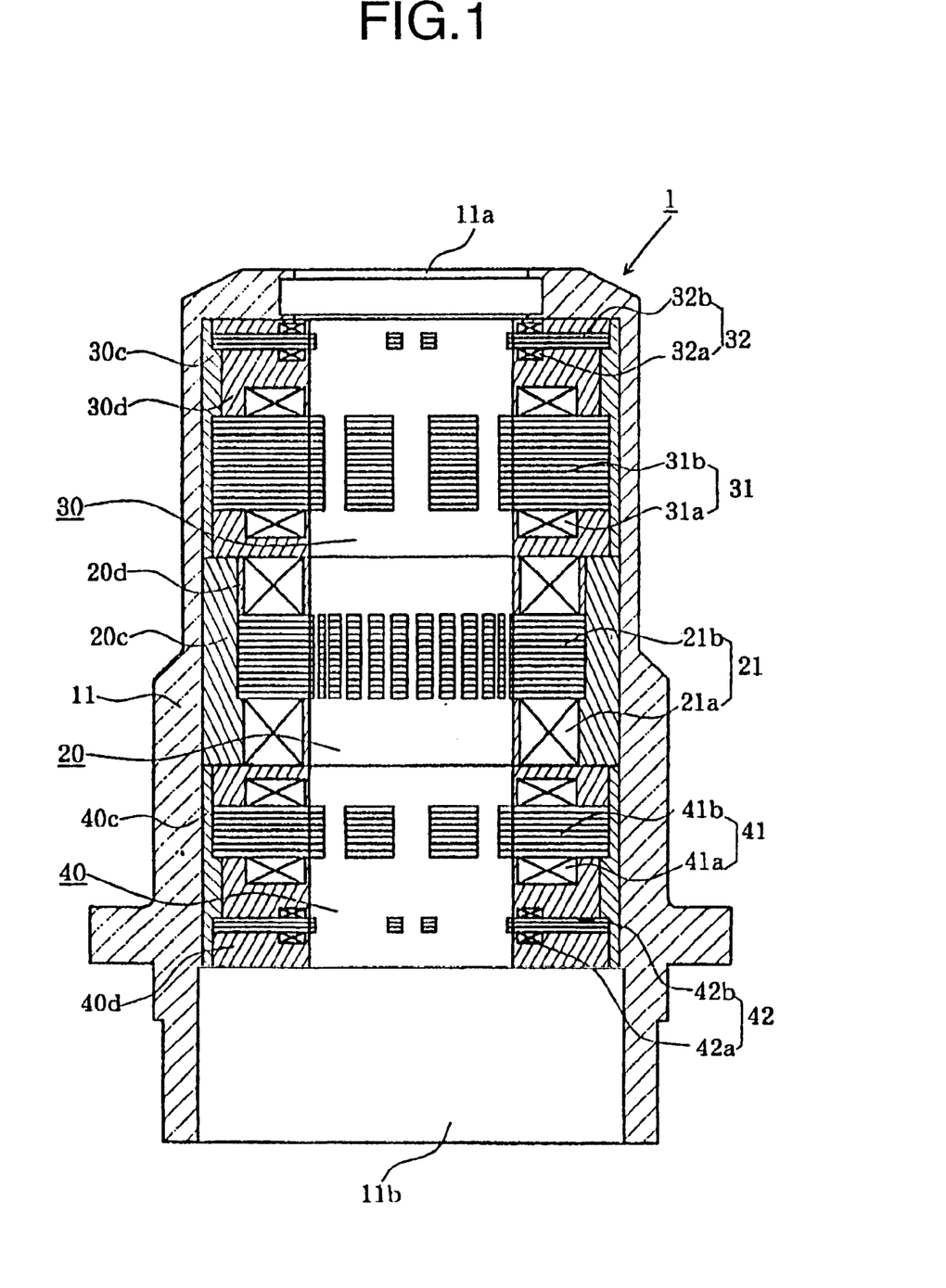
FIG. 1 is a vertical sectional view showing an embodiment of a stator column assembly of a magnetic bearing-device according to the present invention.
Figure 2:
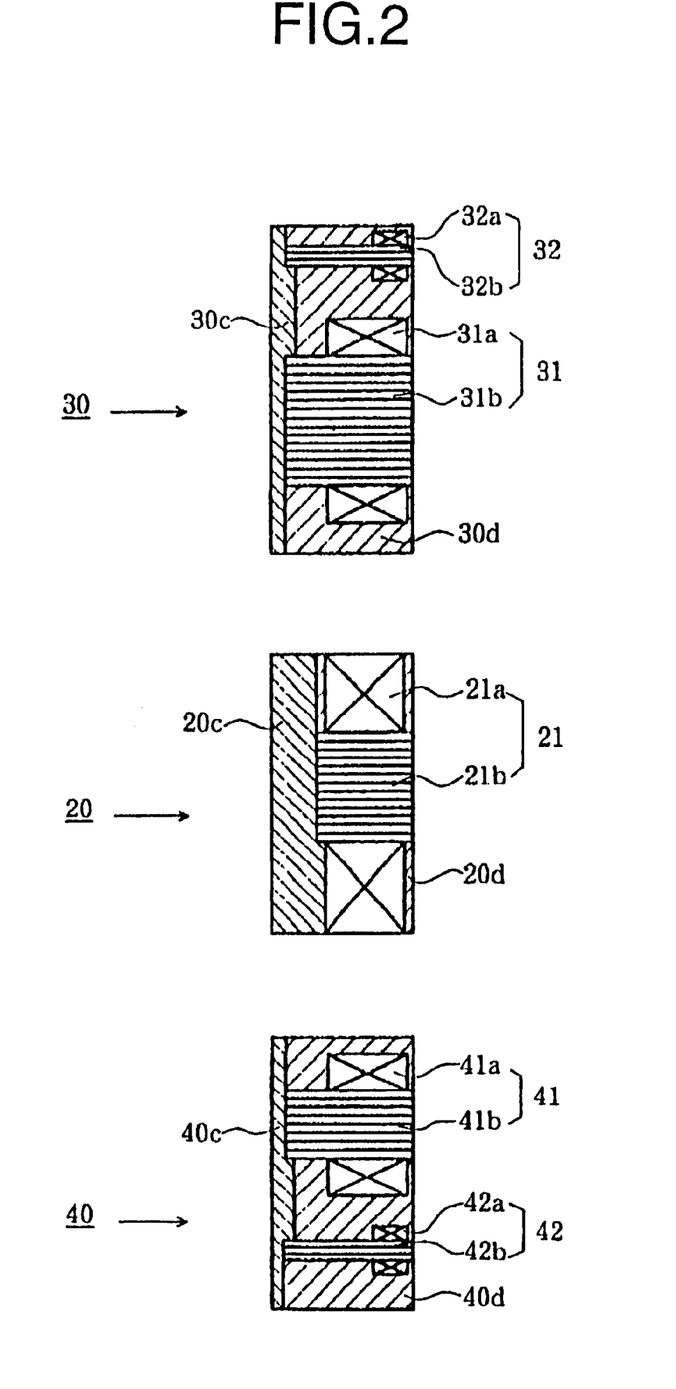
FIG. 2 is a partial sectional view showing an embodiment of an electromagnet unit 30 for a first magnetic bearing, a stator coil unit 20, and an electromagnet unit 40 for a second magnetic bearing the three of which constitute the stator column assembly shown in FIG. 1.

According to an embodiment of a stator column assembly 1 for use in a magnetic bearing device of the present invention, as shown in the sectional views in FIGS. 1 and 2, a first electromagnet unit 30 for a first active radial magnetic bearing, a stator coil unit 20, and a second electromagnet unit 40 for a second active radial magnetic bearing are engaged and fixed to a cylindrical stator column 11 in the order stated with a given fit tolerance.

The first electromagnet unit 30 is constructed as a module in which an electromagnet 31 and a radial displacement sensor 32 for the electromagnet 31 are housed in a circular holding member 30c, and the module is coated with a resin mold member 30d and then molded into a given shape. The circular holding member 30c is a metal (e.g., aluminum) circular member having a stepped inner circumferential face on which a circular projection for positioning is formed at a given position in the axial direction. The electromagnet 31 consists of four pairs of magnetic cores 31b and coils 31a wound around the magnetic cores 31b. The radial displacement sensor 32 consists of four pairs of magnetic cores 32b and coils 32a wound around the magnetic cores 32b.

The stator coil unit 20 is constructed as a module in which a plurality of, 24, for example, magnetic cores 21b having coils 21a wound therearound are attached to a metal circular yoke member 20c to form a stator coil 21, and the module is coated with a resin mold member 20d and then molded into a given shape. The circular yoke member 20c also functions as a circular holding member.

The second electromagnet unit 40 is constructed as a module in which an electromagnet 41 and a radial displacement sensor 42 for the electromagnet 41 are housed in a circular holding member 40c, and the module is coated with a resin mold member 40d and then molded into a given shape. The circular holding member 40c is a metal (e.g., aluminum) circular member having a stepped inner circumferential face on which a circular projection for positioning is formed at a given position in the axial direction. The electromagnet 41 consists of four pairs of magnetic cores 41b and coils 41a wound around the magnetic cores 41b. The radial displacement sensor 42 consists of four pairs of magnetic cores 42b and coils 42a wound around the magnetic cores 42b.

Figure 4:
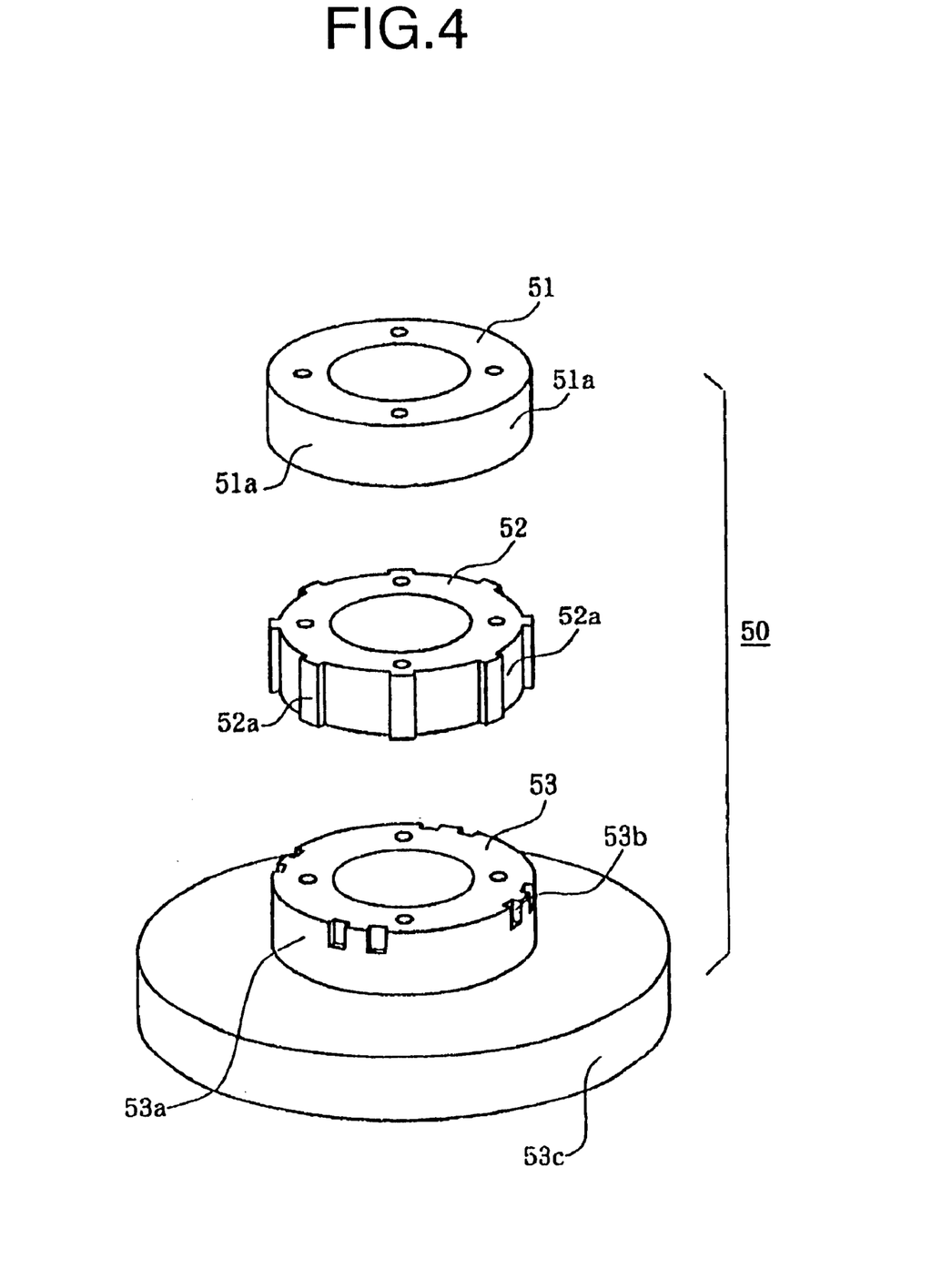
FIG. 4 is a perspective view showing an embodiment of a bushing with three separate parts which is used to fabricate the electromagnet unit for the first magnetic bearing shown in FIG. 2.

Referring to FIG. 4, a description will be given of a method of constructing the first electromagnet unit or module 30. First, the radial displacement sensor 32 and the electromagnet 31 are inserted in the circular holding member 30c and arranged in given positions. The thus half-completed assembly for the electromagnet unit 30 receives a bushing 50 for resin mold and is filled with a thermally curable epoxy resin material, coating those components. The bushing 50 for resin mold is a separated bushing as shown in FIG. 4, and comprises; a first bushing member 51 that is circular and has a flat outer circumferential face 51a; a second bushing member 52 that is circular and has an outer circumferential face 52a on which four pairs of notches 52b for the electromagnet magnetic cores are formed along its axial direction, the notches 52b engaging with the magnetic cores 31b of the electromagnet 31; and a third bushing member 53 that is circular and has a base portion 53c and an outer circumferential face 53a on which four pairs of notches 53b for sensor magnetic cores are formed on its upper edge, the notches 53b engaging with the magnetic cores 32b of the radial displacement sensor 32.

The busing 50 with three separated parts constituted as above is inserted into the half-completed assembly for the electromagnet unit 30 to fill with the thermally curable epoxy resin material. After the charged epoxy resin is cured, the separate bushing 50 is separated and removed to complete the molding of the first electromagnet unit 30, which completes the fabrication of the first electromagnet unit 30. The first electromagnet unit 30 thus molded has a flat resin mold surface except for its inner circumferential face where the magnetic cores 31b of the electromagnet 31 and the magnetic cores 32b of the radial displacement sensor 32 are exposed superficially. Therefore, this presents an advantage of not requiring a cutting and scraping machining for exposing the magnetic cores.

The second electromagnet unit 40 is fabricated in a manner similar to the fabrication of the first electromagnet unit 30. The bushing to be used for resin molding in fabricating the unit 40 is a bushing with three separate parts as shown in FIG. 4. The stator coil unit 20 is also fabricated in the same way as these electromagnetic units. However, the bushing to be used for the resin molding is, this time, a bushing with two separate parts. Neither the second electromagnet unit 40 nor the stator coil unit 20 thus molded requires for their inner circumferential faces a cutting and scraping machining to expose the magnetic cores.

The first electromagnet unit 30, the stator coil unit 20 and the second electromagnet unit 40 fabricated through the above construction and molding are engaged to the cylindrical stator column 11 in the order stated with a given fit tolerance, thereby completing the stator column assembly 1 in accordance with the present invention.

As described above, the first electromagnet unit 30, the stator coil unit 20 and the second electromagnet unit 40 are housed in and fixed to the cylindrical stator column 11 by not press-fitting but slidably engaging. Accordingly, the stator column assembly of the present invention is free from the aforementioned awkwardness in fabrication work, which is a remarkable improvement. The components thus hardly lose their wires for wiring to breakage during the fabrication. Even if the breakage of wire or other factors does take place to cause a defect, it simply requires replacement of the defective unit to save the whole stator column assembly from being a defective article and disposed of, unlike the conventional devices. This, too, is because the component units are housed in and fixed to the cylindrical stator column unit 11 by not press-fitting but engaging.

The conventional stator column assembly 1 is constructed by press-fitting and fixing the components to the cylindrical stator column 11 which are then molded unitedly. Therefore, if a defect takes place due to the breakage of wire or other factors, the conventional stator column assembly 1 has no other choice than disposal. In contrast, the stator column assembly 1 of the present invention is comprised of component units in each of which electromagnetic components (an electromagnet and a radial displacement sensor for the electromagnet, or a stator coil) are housed in a circular holding member to be molded, the component units being engaged and fixed to a cylindrical stator column separately in the order stated. Therefore, it is possible to dispose of only a defective component unit in the present invention. This separate disposal and the above mentioned improvement in facilitating fabrication work reduce cost for manufacturing the magnetic bearing device. Also in recycling resources, the stator column assembly 1 in which molding is separately made for each unit is far easier to process than the unitedly molded one.

Figure 5:
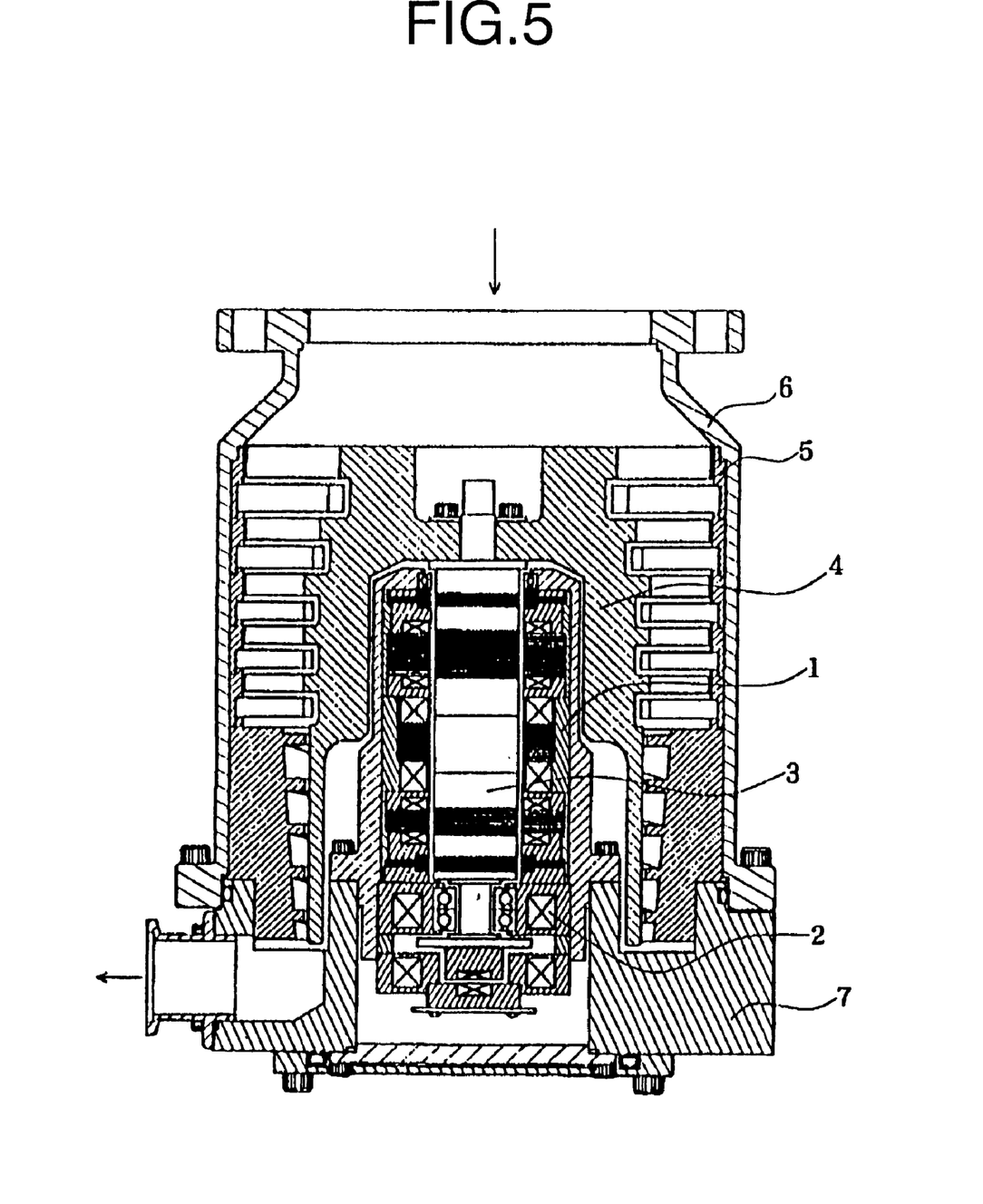
FIG. 5 is a vertical sectional view showing an embodiment of a vacuum pump according to the present invention.

A vacuum pump equipped with the magnetic bearing device of the present invention is, for example, a known composite turbomolecular pump equipped with a 5-axes-control type magnetic bearing device, as shown in a vertical sectional view in FIG. 5. In FIG. 5, reference symbol 1 denotes the stator column assembly shown in FIG. 1; 2, a thrust magnetic bearing; 3, a rotor shaft; 4, a rotor cylindrical body with a cylindrical portion that has many rotor blades attached on its upper side and has a flat outer circumferential face on its lower side; 5, a stator cylindrical body to which the rotor cylindrical body is engaged and in which a cylindrical portion is formed, the cylindrical portion having many stator blades attached on its upper side and having on its lower side an inner circumferential face grooved for a screw; 6, a casing; and 7, a pump base.

In such a vacuum pump, the interior of the pump, especially the rotor shaft 3 and its surroundings reach at a very high temperature from heat generated by current flowing through coils of the components. Thus there has conventionally been a risk of making a resin mold coating the components expand to come in contact with the outer circumferential face of the rotor shaft 3. This is because the structure of the conventional stator column assembly 1, in which the components are press-fitted and fixed to the cylindrical stator column 11 so that the components and the column are then integrally molded, causes the expansion of the resin mold toward the radial direction rather than the axial direction.

Figure 3:
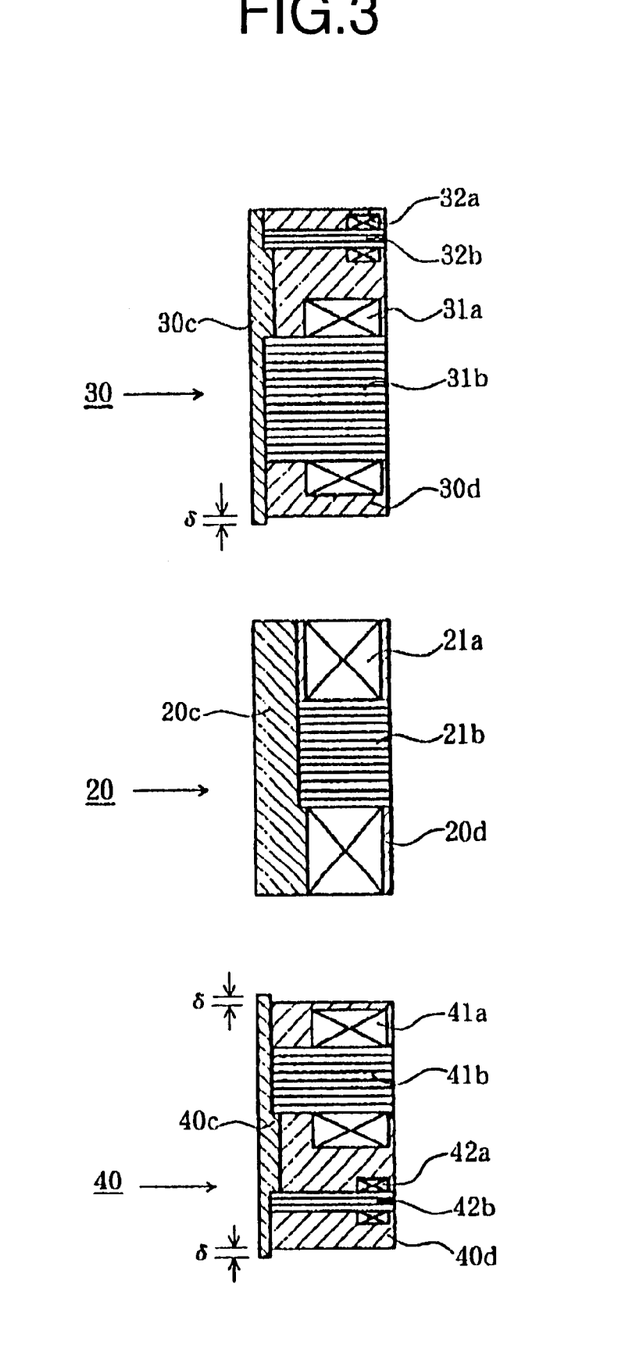
FIG. 3 is a partial sectional view showing another embodiment of the electromagnet unit 30 for the first magnetic bearing, the stator coil unit 20, and the electromagnet unit 40 for the second magnetic bearing the three of which constitute the stator column assembly shown in FIG. 1.

The present invention employs either one of the following as measures for directing expansion of the resin mold in the axial direction and the radial direction. One is to allow a small clearance between every adjacent unit when the first electromagnet unit 30, the stator coil unit 20 and the second electromagnet unit 40 are engaged into the cylindrical stator column 11. The other is to allow a small clearance δ one or both on ends of the circular holding members before molding. For example, as shown in FIG. 3, a small clearance δ is made at the lower end of the circular holding member 30c in the first electromagnet unit 30, and a small clearance δ is made at each of the upper and lower ends of the circular holding member 40c in the second electromagnet unit 40, prior to the respective molding of the units. Each of these measures is readily realized by partially changing the shape of the bushing 50. Incidentally, the small clearance δ may be made not at the lower end of the circular holding member 30c but at its both ends, and may be made at one or both ends of the circular yoke member 20c in the stator coil unit 20.

The description above is of an embodiment in which the present invention is applied to the 5-axes-control type magnetic bearing device. However, the present invention may be applied to other 5-axes-control type magnetic bearing devices having different structures and to 3-axes-control type magnetic bearing devices. Also, a vacuum pump to which the present invention is applicable is not limited to the turbomolecular pump but other differently structured vacuum pumps.

In conclusion, the present invention provides a magnetic bearing device with a stator column assembly and a vacuum pump equipped with the magnetic bearing device, the assembly comprising component units in each of which electromagnetic components (an electromagnet and a radial displacement sensor for the electromagnet, or a stator coil) are housed in a circular holding member to be molded and fixed, the component units being engaged and fixed to a cylindrical stator column separately in the order stated. Simplified fabrication of the stator column assembly is thus remarkably facilitated. Also, an accident during fabrication in which wires of the components are broken is greatly reduced in number and, if the accident such as the breakage of wire does takes place, the invention makes it possible to separately dispose of only a defective component unit. The resource recycling work is also facilitated because the invention makes it easy to remove each component unit from the cylindrical stator column.

Furthermore, the stator column assembly constructed by engaging and fixing the component units has measures for directing the resin mold expansion induced by a high temperature in the axial direction not the radial direction. A contact accident between the resin mold and the rotor shaft due to the thermal expansion is thus prevented, improving the performance of the vacuum pump equipped with this magnetic bearing device.

In addition, the above mentioned separate disposal and improvement in facilitating fabrication work reduce cost for manufacturing the magnetic bearing device, making it possible to provide a vacuum pump less costly and higher in performance than in the prior art.

What is claimed is:

1. A magnetic bearing device having magnetic bearings including an active magnetic bearing for rotatably supporting a rotor shaft that is rotationally driven by a motor having a stator coil, comprising:

a cylindrical stator column;

an electromagnet module comprising a first cylindrical holding member, an electromagnet of the active magnetic bearing attached to an inner peripheral surface of the first cylindrical holding member, and a displacement sensor for the electromagnet attached to the inner peripheral surface of the first cylindrical holding member, the electromagnet and the displacement sensor being coated with a resin; and a stator coil module comprising a second cylindrical holding member and the stator coil attached to an inner peripheral surface of the second cylindrical holding member, the stator coil being coated with a resin;

wherein the electromagnet module and the stator coil module are slidably inserted and removably engaged in the cylindrical stator column and the respective modules are formed with a given tolerance such that thermal expansion thereof does not impede operation of the bearing device.

2. A magnetic bearing device according to claim 1; wherein the resin coating of at least one of the modules has a thickness in the axial direction of the module that is slightly smaller than a thickness in the axial direction of the cylindrical holding member thereof.

3. A vacuum pump having a magnetic bearing for rotatable supporting a rotor shaft; wherein the magnetic bearing comprises the magnetic bearing device according to claim 1.

4. A magnetic bearing device having an active thrust magnetic bearing and first and second active radial magnetic bearings, the three bearings being used to rotatably support a rotor shaft that is rotationally driven by a motor having a stator coil, the magnetic bearing device comprising:

a cylindrical stator column;

a first electromagnet module comprising a first cylindrical holding member, an electromagnet of the first active radial magnetic bearing attached to an inner peripheral surface of the first cylindrical holding member, and a radial displacement sensor for the electromagnet attached to the inner peripheral surface of the first cylindrical holding member, the electromagnet and the displacement sensor being coated with a resin; and a stator coil unit having a second cylindrical holding member and the stator coil attached to an inner peripheral surface of the second cylindrical holding member, the stator coil being coated with a resin;

a second electromagnet module comprising a third cylindrical holding member, an electromagnet of the second active radial magnetic bearing attached to an inner peripheral surface of the third cylindrical holding member, and a radial displacement sensor for the electromagnet attached to the inner peripheral surface of the third cylindrical holding member, the electromagnet and the displacement sensor being coated with a resin wherein the first electromagnet module, the stator coil module and the second electromagnet module are slidably inserted and removably engaged to an inner surface of the cylindrical stator column with the stator coil unit being disposed between the first and second electromagnet units in an axial direction of the stator column, and the respective modules are formed with a given tolerance such that thermal expansion thereof does not impede operation of the bearing device.

5. A magnetic bearing device according to claim 4; wherein the resin coating of at least one of the modules has a thickness in the axial direction of the module that is slightly smaller than the thickness in the axial direction of the cylindrical holding member thereof.

6. A vacuum pump having a magnetic bearing for rotatable supporting a rotor shaft; wherein the magnetic bearing comprises the magnetic bearing device according to claim 4.

7. A magnetic bearing device comprising:

a cylindrical shaft;

one or more electromagnet modules each comprising a first cylindrical holding member and one or more electromagnets attached to an inner peripheral surface of the first cylindrical holding member, the electromagnet being coated with a resin; and a stator coil module comprising a second cylindrical holding member and one or more stator coils attached to an inner peripheral surface of the second cylindrical holding member, the one or more stator coils being coated with a resin;

wherein the one or more electromagnet modules and the stator coil module are slidably inserted and removably engaged in the cylindrical shaft, the stator coil module has an electromagnet module directly adjacent either side thereof in an axial direction of the cylindrical shaft, and the respective modules are formed with a given tolerance such that thermal expansion thereof does not impede operation of the bearing device.

8. A magnetic bearing device according to claim 7; wherein each electromagnet module further comprises a displacement sensor for the one or more electromagnets attached to the inner peripheral surface of the first cylindrical holding member.

9. A magnetic bearing device according to claim 7; wherein the electromagnetic modules are arranged on opposite axial sides of the stator coil module within the cylindrical shaft.

10. A magnetic bearing device according to claim 7; wherein at least one of the first and second cylindrical holding members has a greater axial length than that of the resin-coated components attached to the inner peripheral surface thereof so that thermal expansion of the corresponding module occurs primarily in the axial direction thereof.

11. A vacuum pump having a magnetic bearing for rotatably supporting a rotor shaft; wherein the magnetic bearing comprises the magnetic bearing device according to claim 7.

* * * * *